US012701059B2

(12) United States Patent
Zhu et al.

(10) Patent No.: US 12,701,059 B2
(45) Date of Patent: Aug. 4, 2026

(54) NON-LINEAR FILTERING OF MEASUREMENT REPORT

(71) Applicant: QUALCOMM Incorporated, San Diego, CA (US)

(72) Inventors: Jun Zhu, San Diego, CA (US); Brian Clarke Banister, San Diego, CA (US); Raghu Narayan Challa, San Diego, CA (US)

( * ) Notice: Subject to any disclaimer, the term of this patent is extended or adjusted under 35 U.S.C. 154(b) by 0 days.

(21) Appl. No.: 17/707,291

(22) Filed: Mar. 29, 2022

(65) Prior Publication Data

US 2023/0318943 A1 Oct. 5, 2023

(51) Int. Cl.
| | |
|---|---|
| *H04L 43/028* | (2022.01) |
| *H04B 17/309* | (2015.01) |
| *H04L 5/00* | (2006.01) |
| *H04L 43/06* | (2022.01) |
| *H04W 24/10* | (2009.01) |

(52) U.S. Cl.
CPC ......... *H04L 43/028* (2013.01); *H04B 17/309* (2015.01); *H04L 5/0048* (2013.01); *H04L 43/06* (2013.01); *H04W 24/10* (2013.01)

(58) Field of Classification Search
CPC ..... H04L 43/028; H04L 5/0048; H04L 43/06; H04B 17/309; H04W 24/10; H04W 4/10
See application file for complete search history.

(56) References Cited

U.S. PATENT DOCUMENTS

| | | | |
|---|---|---|---|
| 2010/0112958 A1 | 5/2010 | Krishnamurthy et al. | |
| 2010/0217790 A1* | 8/2010 | Yang ................... | H03H 17/0416 |
| | | | 708/313 |
| 2012/0264476 A1 | 10/2012 | Kleinhenz et al. | |
| 2015/0244444 A1* | 8/2015 | Mazzarese ........... | H04B 17/309 |
| | | | 370/252 |
| 2016/0197680 A1* | 7/2016 | Li ....................... | H04B 10/2543 |
| | | | 398/194 |
| 2018/0124766 A1* | 5/2018 | Nagaraja ............... | H04L 5/0048 |
| 2019/0089579 A1* | 3/2019 | Sang ....................... | H04L 43/08 |
| 2019/0327629 A1* | 10/2019 | Zhang ................... | H04W 24/10 |
| 2019/0342812 A1 | 11/2019 | Yu et al. | |
| 2020/0413277 A1 | 12/2020 | Zhu et al. | |
| 2021/0068000 A1* | 3/2021 | Tao ........................ | H04L 5/0048 |
| 2021/0410080 A1* | 12/2021 | Xiang ....................... | H04W 4/40 |
| 2022/0070808 A1* | 3/2022 | Jacobsen ........... | H04W 56/0035 |
| 2022/0124515 A1* | 4/2022 | Castaneda ........... | H04B 7/0617 |
| 2022/0182087 A1* | 6/2022 | Ellgardt ............... | H04B 1/1036 |
| 2022/0239510 A1* | 7/2022 | Nangare ........... | H04L 25/03343 |
| 2023/0078501 A1* | 3/2023 | Wang ................... | H04L 5/0048 |
| | | | 370/252 |

OTHER PUBLICATIONS

International Search Report and Written Opinion—PCT/US2023/063880—ISA/EPO—Jun. 1, 2023.

* cited by examiner

*Primary Examiner* — Nam T Tran

(57) ABSTRACT

Certain aspects of the present disclosure provide techniques for filtering measurement results at a user equipment (UE). According to certain aspects, a UE may receive reference signals transmitted from a network entity, apply a non-linear filter to measurement results, obtained based on the received reference signals, to obtain filtered measurement results, and transmit, to the network entity, a measurement report based on the filtered.

23 Claims, 8 Drawing Sheets

700

500

UE gNB

Reference Signal(s)

...

applying a non-linear filter to measurement results, obtained based on the received reference signals, to obtain filtered measurement results Measurement Report

700

A METHOD FOR WIRELESS COMMUNICATIONS BY A USER EQUIPMENT (UE)

710

RECEIVE REFERENCE SIGNALS TRANSMITTED FROM A NETWORK ENTITY

720

APPLY A NON-LINEAR FILTER TO MEASUREMENT RESULTS, OBTAINED BASED ON THE RECEIVED REFERENCE SIGNALS, TO OBTAIN FILTERED MEASUREMENT RESULTS

730

TRANSMIT, TO THE NETWORK ENTITY, A MEASUREMENT REPORT BASED ON THE FILTERED MEASUREMENT RESULTS

800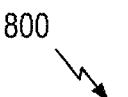

810

808

Transceiver

802

Processing System            806

820                                                    830

Processor(s)                    Computer-Readable
                                Medium/Memory 822                                                    832

Circuitry for receiving reference        Code for receiving reference
signals transmitted from a              signals transmitted from a
network entity                          network entity 824                                                    834

Circuitry for applying a non-linear      Code for applying a non-linear
filter to measurement results,          filter to measurement results,
obtained based on the received          obtained based on the received
reference signals, to obtain            reference signals, to obtain
filtered measurement results            filtered measurement results 826                                                    836

Circuitry for transmitting, to the       Code for transmitting, to the
network entity, a measurement           network entity, a measurement
report based on the filtered            report based on the filtered
measurement results                     measurement results

*FIG. 8*

NON-LINEAR FILTERING OF MEASUREMENT REPORT

INTRODUCTION

Aspects of the present disclosure relate to wireless communications, and more particularly, to techniques for filtering measurements sent by a user equipment (UE) in a measurement report.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communication networks to overcome various challenges.

SUMMARY

One aspect provides a method for wireless communications by a user equipment (UE). The method generally includes receiving reference signals transmitted from a network entity, applying a non-linear filter to measurement results, obtained based on the received reference signals, to obtain filtered measurement results, and transmitting, to the network entity, a measurement report based on the filtered measurement results.

One aspect provides an apparatus for wireless communications by a user equipment (UE). The apparatus generally includes a processor, memory coupled with the processor, and instructions stored in the memory and executable by the processor to cause the apparatus to receive reference signals transmitted from a network entity, apply a non-linear filter to measurement results, obtained based on the received reference signals, to obtain filtered measurement results, and transmit, to the network entity, a measurement report based on the filtered measurement results.

One aspect provides an apparatus for wireless communications by a user equipment (UE). The apparatus generally includes means for receiving reference signals transmitted from a network entity, means for applying a non-linear filter to measurement results, obtained based on the received reference signals, to obtain filtered measurement results, and means for transmitting, to the network entity, a measurement report based on the filtered measurement results.

One aspect provides a non-transitory computer-readable medium comprising executable instructions that, when executed by one or more processors of an apparatus, cause the apparatus to receive reference signals transmitted from a network entity, apply a non-linear filter to measurement results, obtained based on the received reference signals, to obtain filtered measurement results, and transmit, to the network entity, a measurement report based on the filtered measurement results.

According to certain aspects, the non-linear filter may be implemented as a non-linear infinite impulse response (IIR) filter. In some cases, the non-linear filter may have a linear component that is bound by a first value.

According to certain aspects, the first value may be determined based on a configurable parameter X. In some cases, if a change in a current measurement result, relative to a previous measurement result, is less than a threshold value, the non-linear filter may converge to a linear filter. In such cases, the linear component may involve a function of a current measurement result, a previous filtered measurement result, and a filter coefficient $\alpha$.

According to certain aspects, values for at least one of the configurable parameter X or the filter coefficient $\alpha$, are selected based on at least one condition. The at least one condition may involve one or more of: a type of channel the UE is experiencing, at least one of a location or orientation of the UE, or mobility of the UE.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 8 depicts aspects of an example communications device.

DETAILED DESCRIPTION

Figure 1:
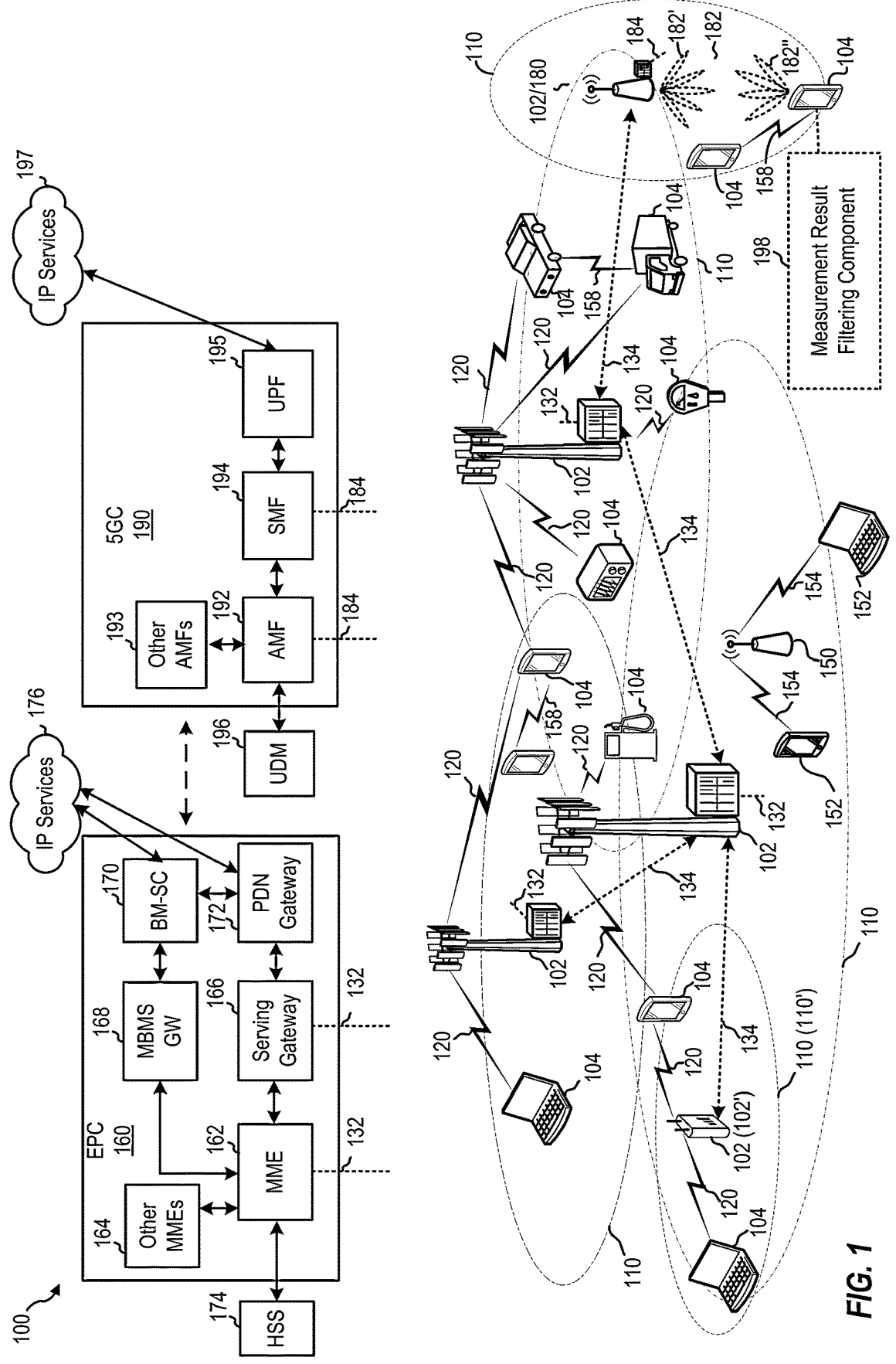
FIG. 1 is a block diagram conceptually illustrating an example wireless communication network.

Aspects of the present disclosure relate to wireless communications, and more particularly, to techniques for applying non-linear filtering to measurements sent, by a user equipment (UE), in a measurement report.

In some cases, directional reference signal (RS) transmitted from a base station (using transmit beams) may be measured by a UE (using receive beams). The UE may apply physical layer (PHY, Layer 1, or L1) filtering on the beam level to track relative position (e.g., rotation) between a UE and a network entity (e.g., a base station such as a gNB). Filtering may be applied on top of shadow and path loss measurements, for example, to average out noise caused by Doppler measurement error.

A filtered measurement may be obtained using the following infinite impulse response (IIR) equation:

$$y(t)=(1-\alpha)y(t-1)+ax(t), \; 0 \le \alpha \le 1;$$

where x(t) is the latest received measurement result from the physical layer, y(t) is the updated filtered measurement result (e.g., used for evaluation of reporting criteria or for measurement reporting), y(t−1) is a previous measurement result (e.g., where y(0) is set to x(1) when the first measurement result from physical layer is received), and $\alpha$ is the filter coefficient.

Unfortunately, this type of filter is less than ideal, because the selection of the filter coefficient, $\alpha$, presents a trade-off in performance, as it can typically be selected to serve only one of the two purposes. The selection of a large $\alpha$ (equivalent to a shallow filter) is effective for tracking new rising/dropping gNB/UE beams (especially in rotation), but is not sufficient to average out noise, Doppler, and measurement error. The selection of a small $\alpha$ (equivalent to a deep filter) is effective for averaging out noise, Doppler, and measurement error, but is not capable of rapidly tracking new rising/dropping gNB/UE beams (especially in rotation). The selection of a small $\alpha$ (equivalent to a deep filter) is effective for averaging out noise, Doppler, and measurement error, but is not capable of tracking new rising/dropping gNB/UE beams (especially in rotation).

In other words, the value of a strikes $\alpha$ balance between weighting the new measurement value and the old filtered measurement results. If $\alpha$ is set to 1, the left hand term of equation is zeroed out and there is no filter, as the equation reduces to:

$$y(t)=x(t).$$

On the other hand, as $\alpha$ approaches zero, the filtering is deeper and the weight of the most current measurement is very small.

Thus, there is no optimal value of $\alpha$, as a large value that would be good for tracking the new rising or dropping gNB/UE beams, especially in the motion, would mean the new measurement will have a larger weight. While this would allow the detection of a sudden rise or drop, it also means that this would not it is not good for averaging out Doppler, noise, and error in the measurement because a sufficient number of measurements would not be factored in.

Aspects of the present disclosure, however, provide a potential solution that may help address this shortcoming. For example, by providing a non-linear IIR filter, for L1 beam level filtering may be able to both track beam changes (by detecting rapid changes in measurements), while still be able to average out Doppler, noise, and error in the measurements. In other words, the proposed solution may effectively provide the combined utility of the selection of a large $\alpha$ (equivalent to a shallow filter) and the selection of a small $\alpha$ (equivalent to a deep filter).

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes Measurement Result Filtering Component 198, which may be used to apply non-linear filtering to measurements results taken at a UE 104.

Figure 2:
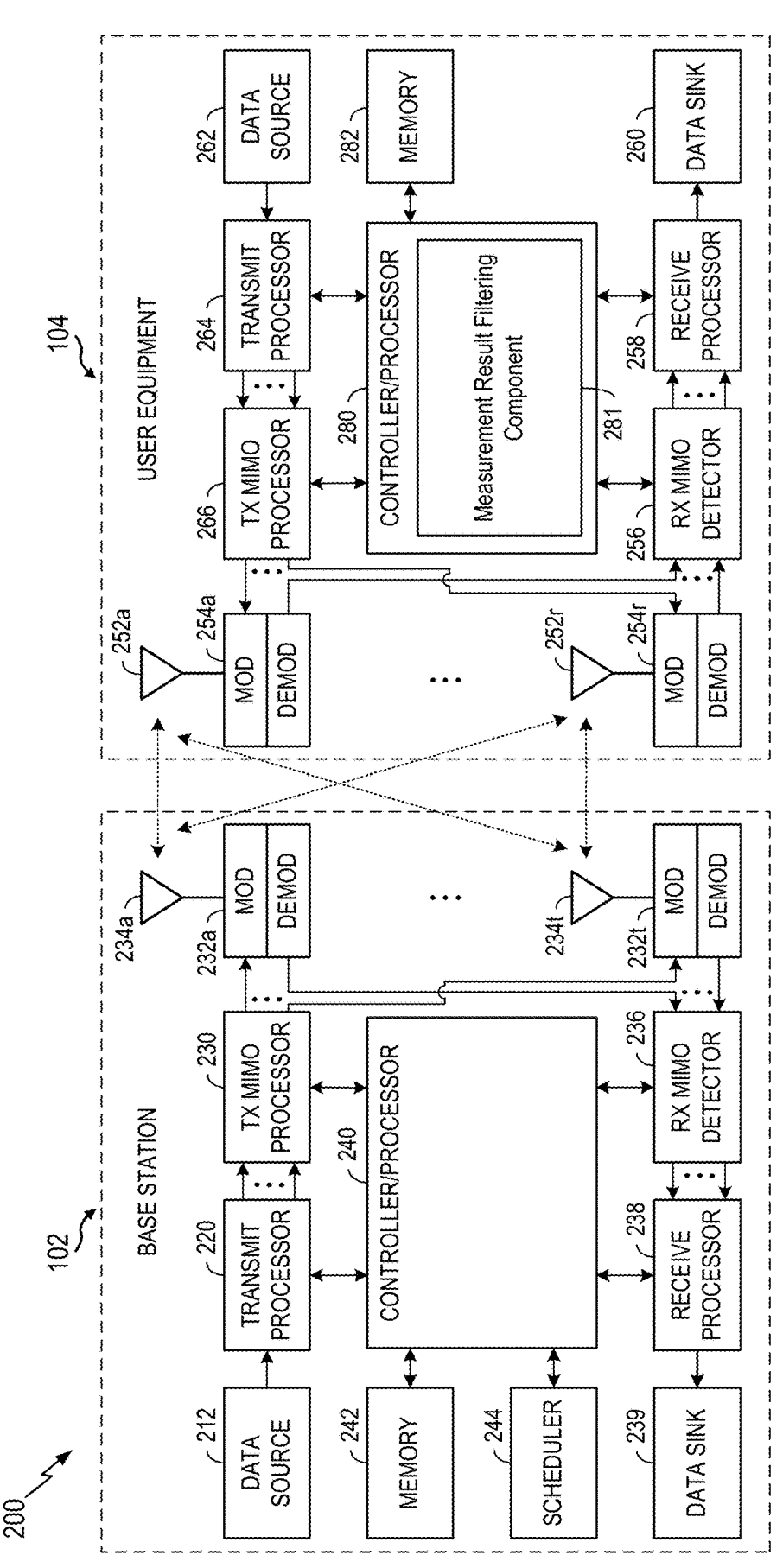
FIG. 2 is a block diagram conceptually illustrating aspects of an example of a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes Measurement Result Filtering Component 281, which may be representative of Measurement Result Filtering Component 198 of FIG. 1. Notably, while depicted as an aspect of controller/processor 280, Measurement Result Filtering Component 281 may be implemented additionally or alternatively in various other aspects of user equipment 104 in other implementations.

Figures 3A, 3B, 3C, 3D:
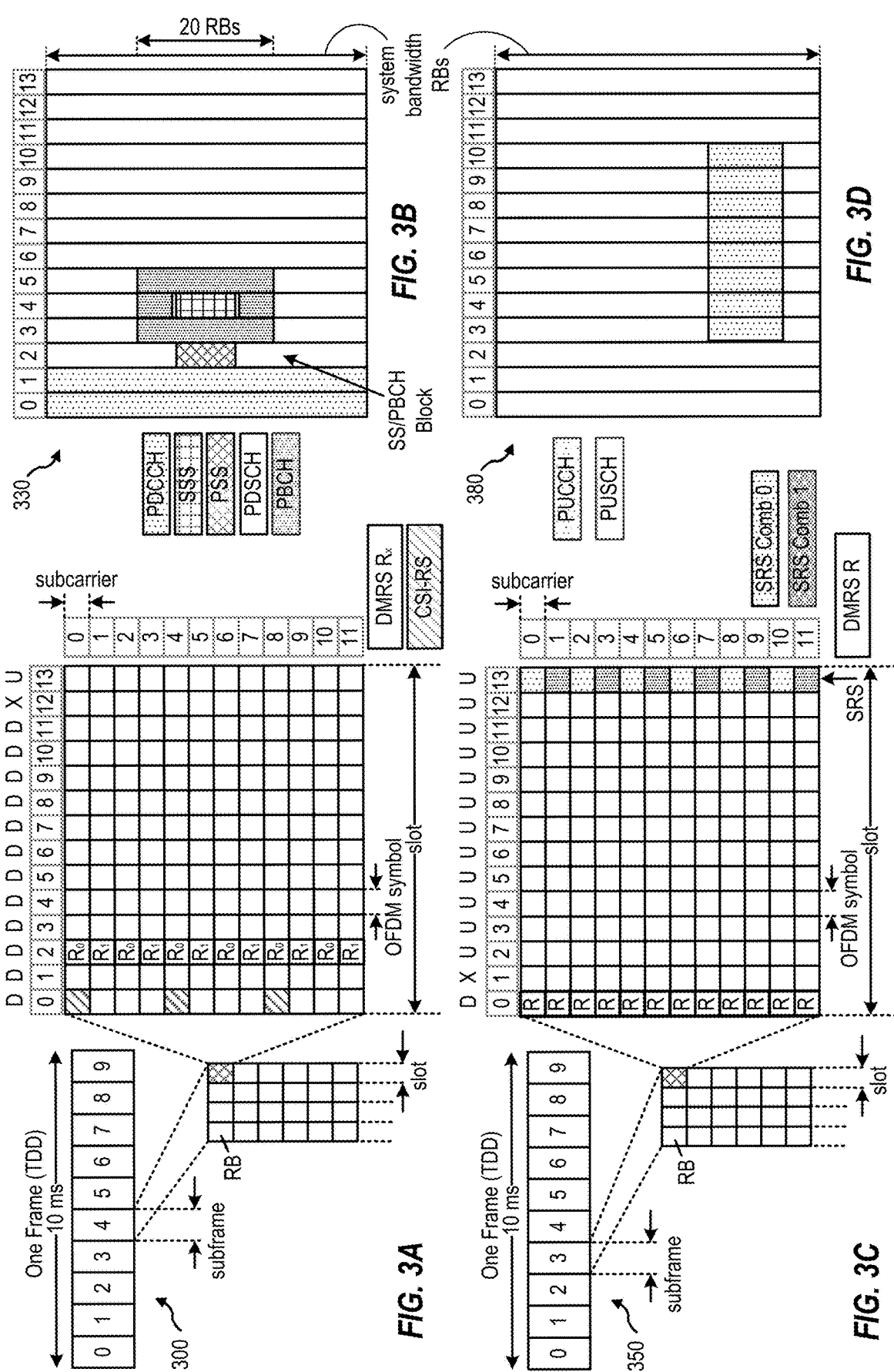
FIG. 3A, FIG. 3B, FIG. 3C, and FIG. 3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Aspects Related to Non-Linear Filtering of Measurement Report

Aspects of the present disclosure relate to wireless communications, and more particularly, to techniques for filtering measurements sent, by a user equipment (UE), in a measurement report. For example, the techniques presented herein may be utilized by a UE to apply physical layer (PHY, Layer 1, or L1) filtering on the beam level to track relative position (e.g., rotation) between a UE and a network entity (e.g., a base station such as a gNB).

As noted above, the conventional linear IIR filter equation is less than ideal, because there is no selection of the filter coefficient, that is optimal for both tracking new rising/dropping gNB/UE beams and also averaging out noise, Doppler, and measurement error.

Figure 4B:
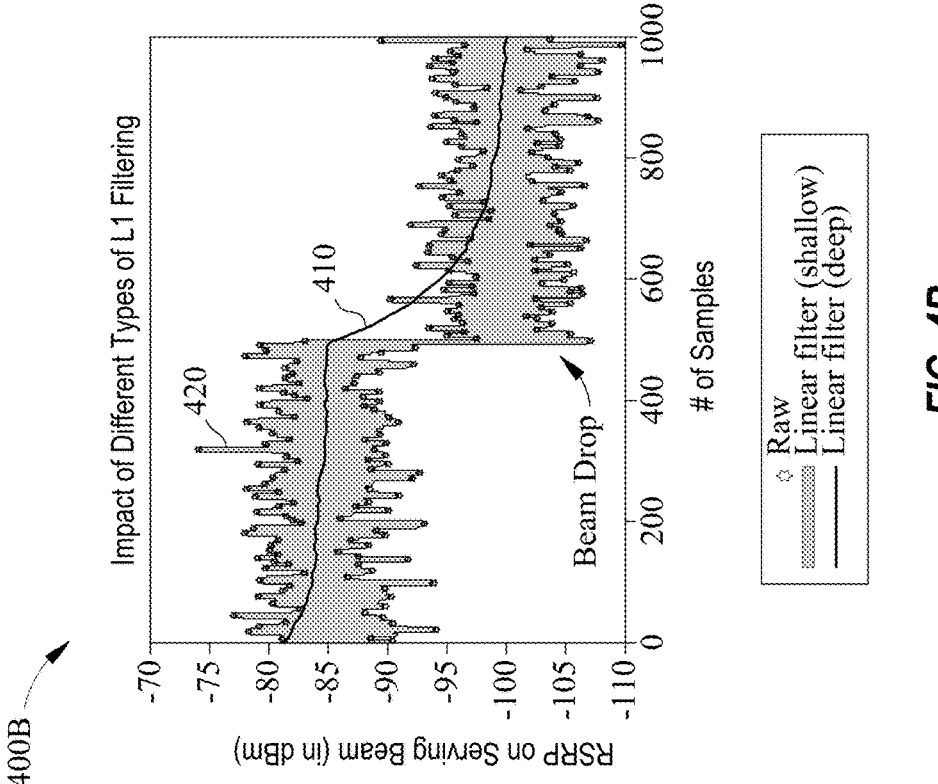
FIG. 4A and FIG. 4B depict examples of the impact of different types of filtering applied to measurement results.
Figure 4A:
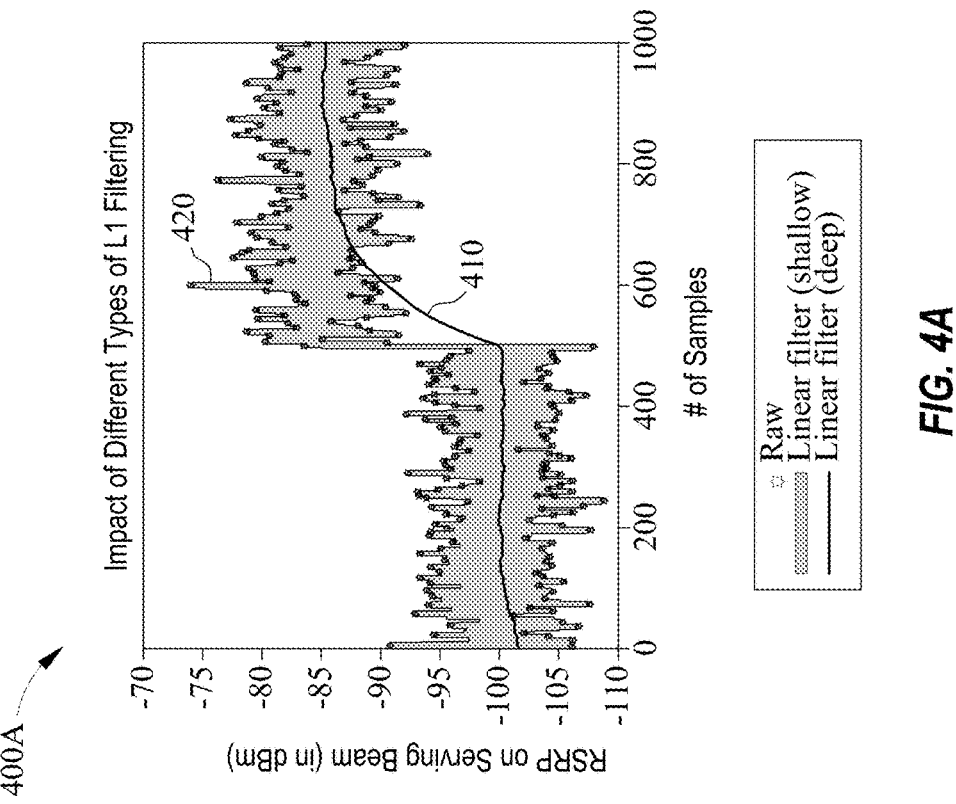

This limitation on these different types of filter coefficients can be observed with reference to the graphs of serving beam reference signal received power (RSRP) shown in FIGS. 4A and 4B, which illustrated rising beam and falling beam scenarios, respectively. For example, a rising beam scenario may correspond to removal of some type of blockage between a gNB and UE, while a falling beam scenario may result from sudden blockage (or rotation/change in orientation).

As illustrated in FIGS. 4A and 4B, with the filter coefficient, α, set to a small value (corresponding to a deep linear filter), averaging is good and the corresponding plot 410 is smooth, but responds too slow to rapidly detect the beam rise and beam drop. On the other hand, with the filter coefficient, $\alpha$, set to a large value (corresponding to a shallow linear filter), there is essentially no averaging, as the corresponding plot 420 essentially tracks the raw (unfiltered) measurement samples.

The non-linear filtering proposed herein, however, may allow a UE to both track rapid beam changes, while still being able to average out noise, Doppler, and measurement error.

Figure 5:
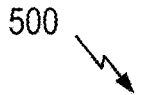
FIG. 5 illustrates an example call flow diagram for filtering measurement results at a UE, in accordance with certain aspects of the present disclosure.

Non-linear filtering of UE measurement results, in accordance with certain aspects of the present disclosure, may be understood with reference to the call flow diagram 500 of FIG. 5.

In the illustrated example, the UE measures reference signals transmitted by the gNB. The UE applies a non-linear filter to the measurement results, to obtain filtered measurement results. Finally, the UE transmits a measurement report to the gNB based on the filtered measurement results.

According to certain aspects, the non-linear filter applied by the UE may take the following form:

$$y(t)=\max(x(t)-X,\min(x(t)+X,(1-\alpha)y(t-1)+\alpha x(t))),$$

where $0\leq\alpha\leq1$ and X is a configurable (tunable) parameter.

Figure 6B:
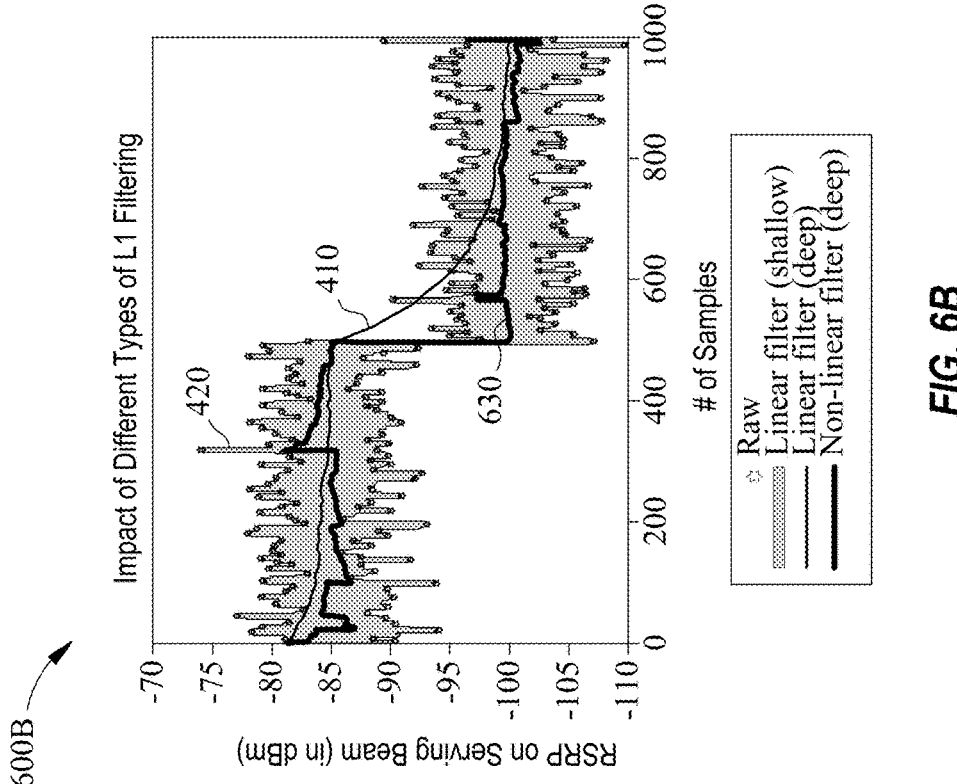
FIG. 6A and FIG. 6B depict examples of the impact of non-linear filtering applied to measurement results, in accordance with certain aspects of the present disclosure.
Figure 6A:
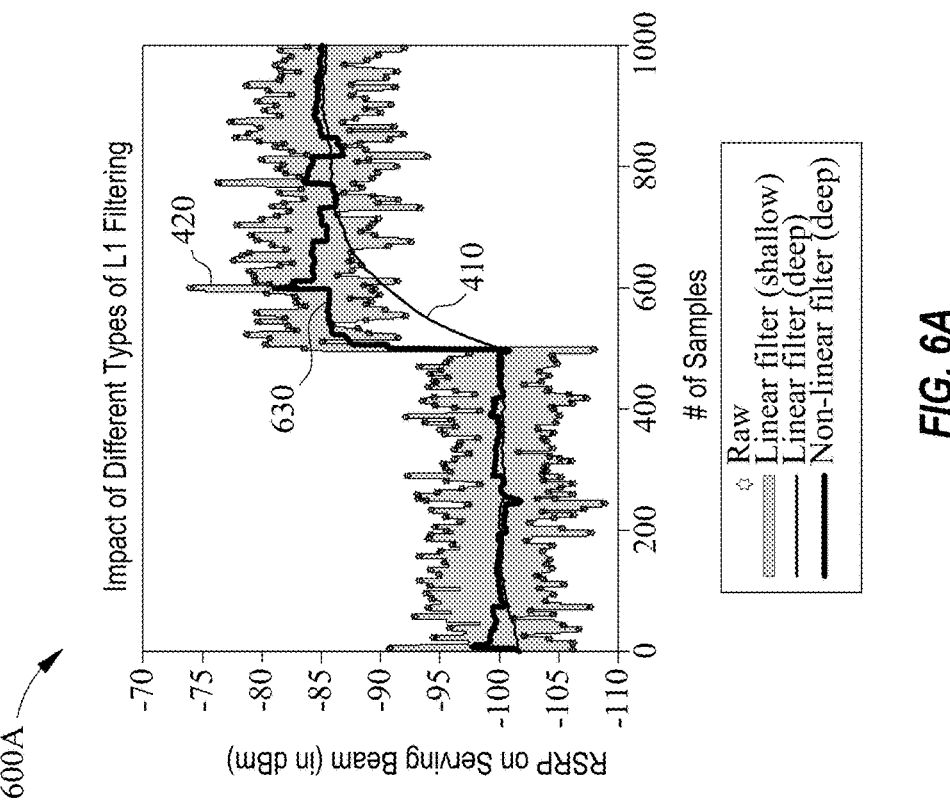

This positive impact on this non-linear filter can be observed with reference to the graphs of serving beam RSRP shown in FIGS. 6A and 6B, which illustrated rising beam and falling beam scenarios, respectively.

As illustrated by the plot 630 in FIGS. 6A and 6B, the non-linear filtering (e.g., per the equation above) is able to respond rapidly detect the beam rise and the beam drop (much faster than the slow changing plot 410). The non-linear filtering is also able to achieve adequate filtering, as indicated by the smoothness of plot 630 (e.g., relative to the shallow linear filter plot 420).

As shown in the equation above, the type of filter proposed herein has a linear component in the same form as the linear IIR filter described above, but the non-linear filter above in effect, bounds this linear component based on configurable parameter X.

In the equation above, the non-linear filter and configurable parameter X may be designed such that the non-linear filter converges to a linear filter if a change in a current measurement result, relative to a previous measurement result, is less than a threshold value. In such cases, the left hand portion of the equation above may be removed, leaving the linear component (the right hand side of the min equation), which is the same as the conventional linear IIR equation described above.

In some cases, values for at least one of the configurable parameter X or the filter coefficient $\alpha$, may be selected based on at least one condition. For example, the at least one condition may involve at least one of a type of channel the UE is experiencing, at least one of a location of the UE, and mobility of the UE.

Aspects of the present disclosure provide a framework to capture beam change and speed up its RSRP update, while still managing adequate filtering, which results in a smoother RSRP report. As such, the non-linear filtering may still be able to detect rapid changes, such as when a line-of-sight channel is suddenly blocked (or a previously blocked channel becomes unblocked).

Example Operations

Figure 7:
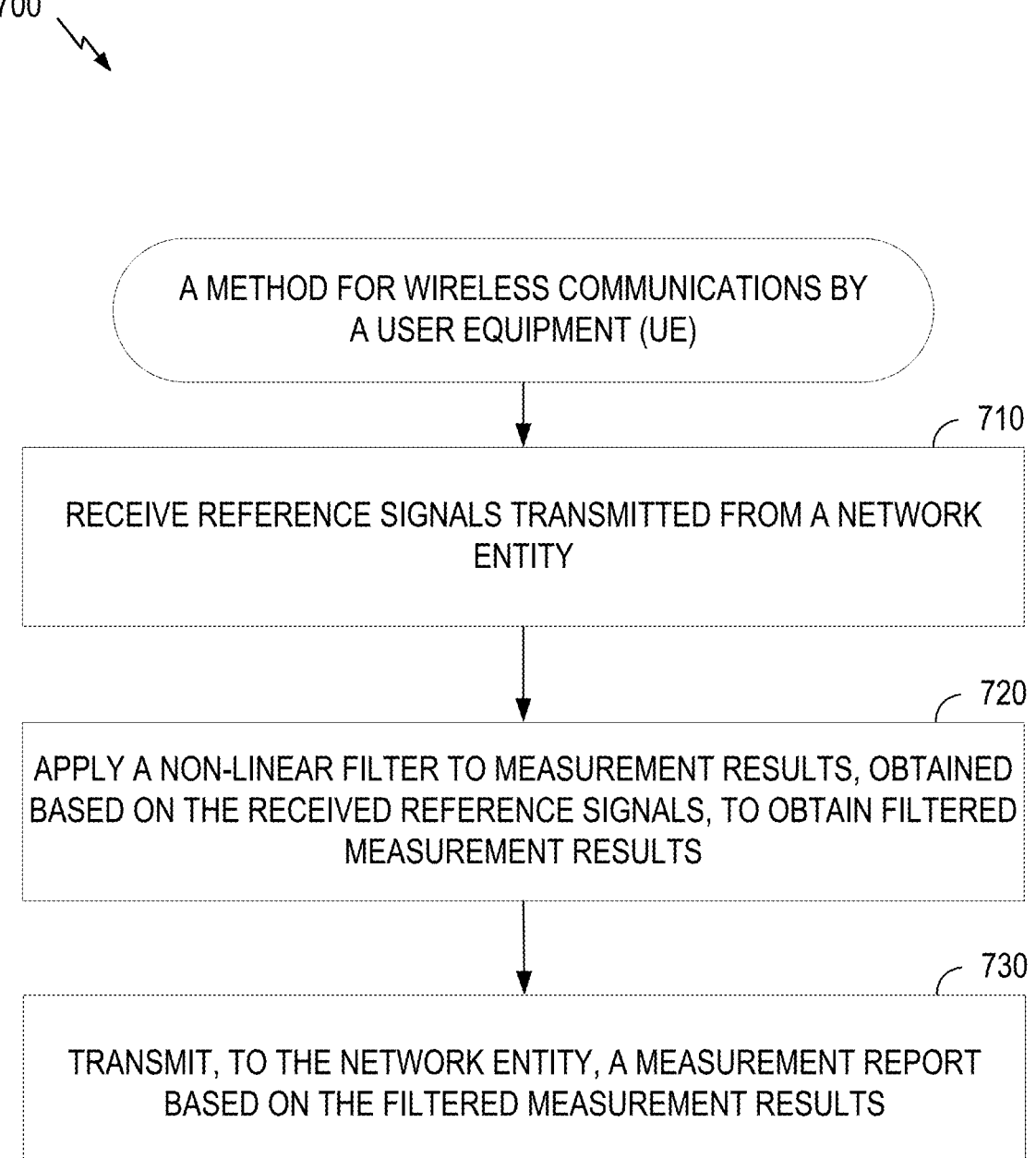
FIG. 7 illustrates example operations for wireless communications at a UE, in accordance with certain aspects of the present disclosure.

FIG. 7 illustrates example operations 700 for wireless communication by a UE. The operations 700 may be performed, for example, by a UE (e.g., such as a UE 104 of FIG.

1) to apply non-linear filtering to measurement results, in accordance with aspects of the present disclosure.

Operations 700 begin, at 710, by receiving reference signals transmitted from a network entity. At 720, the UE applies a non-linear filter to measurement results, obtained based on the received reference signals, to obtain filtered measurement results.

As noted above, the non-linear filter may be a non-linear infinite impulse response (IIR) filter. The non-linear filter may include a linear component that is bound by a first value. The first value may be determined based on a configurable parameter X. The non-linear filter may converge to a linear filter if a change in a current measurement result, relative to a previous measurement result, is less than a threshold value.

In some cases, the linear component may utilize a function of a current measurement result, a previous filtered measurement result, and a filter coefficient $\alpha$. In some cases, values for at least one of the configurable parameter X or the filter coefficient $\alpha$, may be selected based on at least one condition. The at least one condition may involve one or more of: a type of channel the UE is experiencing, at least one of a location or orientation of the UE, or mobility of the UE.

At 730, the UE transmits a measurement report based on the filtered measurement results.

Example Wireless Communication Devices

FIG. 8 depicts an example communications device 800 that includes various components operable, configured, or adapted to perform operations for the techniques disclosed herein, such as the operations depicted and described with respect to FIG. 12. In some examples, communication device 800 may be a user equipment 104 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 7, or other operations for performing the various techniques discussed herein.

In the depicted example, computer-readable medium/memory 830 stores code 832 for receiving reference signals transmitted from a network entity, code 834 for applying a non-linear filter to measurement results, obtained based on the received reference signals, to obtain filtered measurement results, and code 836 for transmitting, to the network entity, a measurement report based on the filtered measurement results.

In the depicted example, the one or more processors 820 include circuitry configured to implement the code stored in the computer-readable medium/memory 830, including circuitry 822 for receiving reference signals transmitted from a network entity, circuitry 824 for applying a non-linear filter to measurement results, obtained based on the received reference signals, to obtain filtered measurement results, and circuitry 826 for transmitting, to the network entity, a measurement report based on the filtered measurement results.

Various components of communications device 800 may provide means for performing the methods described herein, including with respect to FIG. 7.

In some examples, means for transmitting or sending (or means for outputting for transmission) may include the transceivers 254 and/or antenna(s) 252 of the user equipment 104 illustrated in FIG. 2 and/or transceiver 1508 and antenna 1510 of the communication device 800 in FIG. 8.

In some examples, means for receiving (or means for obtaining) may include the transceivers 254 and/or antenna (s) 252 of the user equipment 104 illustrated in FIG. 2 and/or transceiver 808 and antenna 810 of the communication device 800 in FIG. 8.

In some examples, means for generating and/or transmitting may include various processing system components, such as: the one or more processors 820 in FIG. 8, or aspects of the user equipment 104 depicted in FIG. 2, including receive processor 258, transmit processor 264, TX MIMO processor 266, and/or controller/processor 280 (including FD capability component 281).

Notably, FIG. 8 is an example, and many other examples and configurations of communication device 800 are possible.

EXAMPLE CLAUSES

Implementation examples are described in the following numbered clauses:

Aspect 1: A method for wireless communications at a user equipment (UE), comprising: receiving reference signals transmitted from a network entity; applying a non-linear filter to measurement results, obtained based on the received reference signals, to obtain filtered measurement results; and transmitting, to the network entity, a measurement report based on the filtered measurement results.

Aspect 2: The method of Aspect 1, wherein the non-linear filter comprises a non-linear infinite impulse response (IIR) filter.

Aspect 3: The method of any one of Aspects 1-2, wherein the non-linear filter comprises a linear component that is bound by a first value.

Aspect 4: The method of Aspect 3, wherein the first value is determined based on a configurable parameter X.

Aspect 5: The method of Aspect 3, wherein the non-linear filter converges to a linear filter if a change in a current measurement result, relative to a previous measurement result, is less than a threshold value.

Aspect 6: The method of Aspect 4, wherein the linear component comprises a function of a current measurement result, a previous filtered measurement result, and a filter coefficient $\alpha$.

Aspect 7: The method of Aspect 6, further comprising selecting values for at least one of the configurable parameter X or the filter coefficient $\alpha$, based on at least one condition.

Aspect 8: The method of Aspect 7, wherein the at least one condition involves a type of channel the UE is experiencing.

Aspect 9: The method of Aspect 7, wherein the at least one condition involves at least one of a location or orientation of the UE.

Aspect 10: The method of Aspect 7, wherein the at least one condition involves mobility of the UE Clause 11: An apparatus, comprising: a memory comprising executable instructions; one or more processors configured to execute the executable instructions and cause the apparatus to perform a method in accordance with any one of Clauses 1-10.

Clause 12: An apparatus, comprising means for performing a method in accordance with any one of Clauses 1-10.

Clause 13: A non-transitory computer-readable medium comprising executable instructions that, when executed by one or more processors of an apparatus, cause the apparatus to perform a method in accordance with any one of Clauses 1-10.

Clause 14: A computer program product embodied on a computer-readable storage medium comprising code for performing a method in accordance with any one of Clauses 1-10.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/ or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a*-*t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of defining user equipment (UE) capability for machine learning (ML) support across a network cell group in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a user equipment (UE), comprising:
at least one memory comprising computer-executable instructions; and
one or more processors configured to execute the computer-executable instructions and cause the apparatus to:
receive reference signals transmitted from a network entity;
apply a non-linear filter to measurements, obtained based on the reference signals, to obtain non-linearly filtered measurements, wherein the non-linear filter enables the apparatus to track rapid beam changes while averaging out at least one of noise, Doppler effects, or measurement errors associated with the measurements; and
transmit, to the network entity, a measurement report including the non-linearly filtered measurements.

2. The apparatus of claim 1, wherein the non-linear filter comprises a non-linear infinite impulse response (IIR) filter.

3. The apparatus of claim 1, wherein the non-linear filter comprises a linear component that is bound by a first value.

4. The apparatus of claim 3, wherein the first value is determined based on a configurable parameter X.

5. The apparatus of claim 3, wherein the non-linear filter converges to a linear filter if a change in a current measurement, relative to a previous measurement, is less than a threshold value.

6. The apparatus of claim 4, wherein the linear component comprises a function of a current measurement, a previous filtered measurement, and a filter coefficient a.

7. The apparatus of claim 6, wherein the one or more processors are further configured to cause the apparatus to select values for at least one of the configurable parameter X or the filter coefficient a, based on at least one condition.

8. The apparatus of claim 7, wherein the at least one condition involves a type of channel the UE is experiencing.

9. The apparatus of claim 7, wherein the at least one condition involves at least one of a location of the UE or an orientation of the UE.

10. The apparatus of claim 7, wherein the at least one condition involves mobility of the UE.

11. The apparatus of claim 1, wherein the non-linear filter enables the apparatus to track the rapid beam changes while averaging out noise, Doppler effects, and measurement errors associated with the measurements.

12. A method for wireless communications at a user equipment (UE), comprising:
receiving reference signals transmitted from a network entity;
applying a non-linear filter to measurements, obtained based on the reference signals, to obtain non-linearly filtered measurements, wherein the non-linear filter enables the UE to track rapid beam changes while averaging out at least one of noise, Doppler effects, or measurement errors associated with the measurements; and
transmitting, to the network entity, a measurement report including the non-linearly filtered measurements.

13. The method of claim 12, wherein the non-linear filter comprises a non-linear infinite impulse response (IIR) filter.

14. The method of claim 12, wherein the non-linear filter comprises a linear component that is bound by a first value.

15. The method of claim 14, wherein the first value is determined based on a configurable parameter X.

16. The method of claim 15, wherein the linear component comprises a function of a current measurement, a previous filtered measurement, and a filter coefficient a.

17. The method of claim 16, further comprising selecting values for at least one of the configurable parameter X or the filter coefficient a, based on at least one condition.

18. The method of claim 17, wherein the at least one condition involves a type of channel the UE is experiencing.

19. The method of claim 17, wherein the at least one condition involves at least one of a location of the UE or an orientation of the UE.

20. The method of claim 17, wherein the at least one condition involves mobility of the UE.

21. The method of claim 14, wherein the non-linear filter converges to a linear filter if a change in a current measurement, relative to a previous measurement, is less than a threshold value.

22. An apparatus for wireless communications at a user equipment (UE), comprising:
means for receiving reference signals transmitted from a network entity;
means for applying a non-linear filter to measurements, obtained based on the reference signals, to obtain non-linearly filtered measurements, wherein the non-linear filter enables the apparatus to track rapid beam changes while averaging out at least one of noise, Doppler effects, or measurement errors associated with the measurements; and
means for transmitting, to the network entity, a measurement report including the non-linearly filtered measurements.

23. A non-transitory computer-readable medium comprising executable instructions that, when executed by one or more processors of an apparatus, cause the apparatus to:
receive reference signals transmitted from a network entity;
apply a non-linear filter to measurements, obtained based on the reference signals, to obtain non-linearly filtered measurements, wherein the non-linear filter enables the apparatus to track rapid beam changes while averaging out at least one of noise, Doppler effects, or measurement errors associated with the measurements; and
transmit, to the network entity, a measurement report including the non-linearly filtered measurements.

* * * * *